United States Patent [19]

Lobitz

[11] Patent Number: 4,582,524
[45] Date of Patent: Apr. 15, 1986

[54] NON-CAKING GRANULAR MINERAL FERTILIZER AND PROCESS FOR ITS PRODUCTION

[75] Inventor: Fritz Lobitz, Ismaning, Fed. Rep. of Germany

[73] Assignee: SKW Trostberg Aktiengesellschaft, Trostberg, Fed. Rep. of Germany

[21] Appl. No.: 682,813

[22] Filed: Dec. 18, 1984

Related U.S. Application Data

[63] Continuation of Ser. No. 166,712, Jul. 7, 1980, abandoned.

[30] Foreign Application Priority Data

Jul. 12, 1979 [DE] Fed. Rep. of Germany ....... 2928143

[51] Int. Cl.$^4$ .......................... C05C 7/00; C05C 13/00
[52] U.S. Cl. ........................................... 71/27; 71/30; 71/55; 71/64.03
[58] Field of Search ....................................... 71/27–30, 71/58, 59, 55–57, 64.03–64.06

[56] References Cited

U.S. PATENT DOCUMENTS 4,234,332 11/1980 Michard et al. .................... 71/27 X

FOREIGN PATENT DOCUMENTS 2051935 5/1970 Fed. Rep. of Germany .......... 71/27

OTHER PUBLICATIONS

Inorganic Syntheses, vol. I, Booth, G. B. L. Smith, 1939, pp. 96–97.

Primary Examiner—Ferris H. Lander
Attorney, Agent, or Firm—Felfe & Lynch

[57] ABSTRACT

A process for the production of a mixed crystalline non-caking granular mineral fertilizer based on ammonium salts such as ammonium sulphate, ammonium nitrate or ammonium phosphate, as well as mixtures thereof, optionally with further additives, comprising forming a melt or solution susceptible of granulation of the ammonium salts, adding dicyandiamide in an amount to result in a total content of 0.1 to 10% by weight, to the melt or solution susceptible of granulation of the ammonium salt prior to its granulation and then effecting granulation of the ammonium salts.

3 Claims, No Drawings

NON-CAKING GRANULAR MINERAL FERTILIZER AND PROCESS FOR ITS PRODUCTION

This application is a continuation of application Ser. No. 166,712, filed 7/7/80, abandoned.

The invention relates to the prevention of caking of mineral fertilisers based on ammonium salts.

The tendency of ammonium salts to cake under the influence of humidity is known. Since these salts and especially the sulphates, nitrates and phosphates, are used to a large extent as fertilizers, many attempts have been made to protect the stored fertilisers from humidity in order that they may continue to be capable of being scattered. To this end, it is customary to bag the fertilisers in airtight sacks. After having been stored for a comparatively long period of time, the contents of the sacks nevertheless become lumpy so that it is extremely difficult to scatter them. Another measure which has been adopted is to powder the surface of each individual fertiliser particle after granulation with an inert material such as particulate talc, kieselguhr or the like. In this way, direct contact of the particles with one another is avoided and caking is substantially reduced. However, this has the disadvantage that due to excess filler material fertilisers so treated will dust as they are being scattered.

It is also known to coat the surfaces of the granular or spheroidal fertiliser salts with a protective covering. Thus, German patent application DOS No. 23 32 730 describes, for this purpose, the use of organic compounds which have a highly branched aliphatic radical and at least one hydrophilic radical. Furthermore, it is known to use protective coverings of sulphur, which is applied in a molten state, of finely-divided sulphur and of wax and/or oil, as such or in the form of mixtures, as have been described in German patent application DOS No. 23 40 638.

These known measures certainly enable an improvement of the storage stability of the fertilisers to be achieved. However, the described coatings or coverings are substances which have to be applied in a separate working step.

It is, therefore, an object of the present invention to overcome this disadvantage and to provide a process which avoids a subsequent treatment of the fertiliser granules in a separate working step and gives a non-caking granular fertiliser in an economic manner.

The solution of this problem is based on the surprising discovery that a content of from 0.1 to 10% by weight by dicyandiamide in nitrogenous fertiliser granules consisting essentially of ammonium salts prevents a caking of the granules. This effect is completely unexpected since technical grade dicyandiamide, when stored in sacks or silos, cakes very considerably after only a very short time and practically loses its pourability.

Thus, according to the present invention, there is provided a non-caking, granular mineral fertiliser based on ammonium salts, such as ammonium sulphate, nitrate or phosphate, or mixtures thereof, which can contain further additives, the fertiliser having a content of 0.1 to 10% by weight of dicyandiamide.

The dicyandiamide is preferably uniformly distributed in the granules but it can also be concentrated in the region of the surface of the granules.

Dicyandiamide has long been known as an additive for fertilisers but mainly as an additive for the inhibition of nitrification. However, its granule-stabilizing action has only now been observed in connection with the present invention.

A clear explanation of this surprising effect of dicyandiamide cannot be deduced. However, it can be assumed that mixed crystals of ammonium salt and dicyandiamide are present in the granulates which have a lesser tendency to recrystallise under the influence of atmospheric moisture so that the pourability of the fertilisers is maintained.

In principle, the present invention can be applied to all fertilisers based on ammonium salts, i.e. the effect of non-caking of fertiliser granules due to the addition of dicyandiamide, preferably in an amount of from 4 to 8% by weight, referred to the total weight of the fertiliser, also clearly manifests itself when the fertiliser also contains other additives, for example, in the case of mixed fertilisers containing additional potassium or magnesium salts, as well as in the case of fertilisers which also contain sparingly soluble components.

In connection with the present invention, ammonium phosphate, ammonium nitrate and ammonium sulphate, as well as mixtures thereof, have been particularly investigated. The surprising effect of dicyandiamide as an agent for preventing caking has also been demonstrated on commercially available NP and NPK fertilisers.

The dicyandiamide is preferably incorporated by adding it in solid form to a water-containing melt of an ammonium salt or of a mixture of ammonium salts and subsequent granulation of the melt.

The following Examples are given for the purpose of illustrating the present invention:

EXAMPLE 1

A mixture of 60 parts by weight of ammonium sulphate and 40 parts by weight of ammonium nitrate is mixed with such an amount of water that it melts at 80° C. 4 Parts by weight of dicyandiamide are dissolved therein, whereafter the melt is granulated.

A Petri dish is filled to a height of 1 cm. with the granulate and left to stand for 4 weeks with the free admittance of atmospheric moisture. For the purpose of comparison, a mixture of ammonium sulphate and ammonium nitrate was prepared in an analogous manner but without the addition of dicyandiamide. After 4 weeks, the granules without the additiion of dicyandiamide had caked together solidly, whereas those with the addition of dicyandiamide were still completely free-flowing.

EXAMPLE 2

A commercially available NP fertiliser 20/20 (ammonium nitrate/ammonium phosphate) was mixed with 8% by weight of dicyandiamide, granulated and dried.

The granulate was exposed in a rapid test at ambient temperature to an atmosphere of varying moisture content.

By way of comparison, a quantity of the same NP fertiliser without the addition of dicyandiamide was treated in the same way.

In the case of the dicyandiamide-containing storage sample, the tendency to caking was markedly reduced.

An analogous result was also obtained when using a commercially available NPK fertiliser 15/15/15, which is a correspondingly composed mixture of ammonium nitrate, di- and monoammonium phosphate, dicalcium phosphate and potassium chloride.

EXAMPLE 3

Commercially available ammonium nitrate was mixed with 5% by weight dicyandiamide, melted and prilled. In a rapid test, the granulate was exposed at ambient temperature to an atmosphere of varying moisture content.

By way of comparison, an amount of ammonium nitrate was prilled but without the addition of dicyandiamide and then treated in the same way.

In the case of the dicyandiamide-containing storage samples the tendency to caking was markedly reduced.

I claim:

1. A process for the production of a mixed crystalline non-caking granular mineral fertilizer comprising ammonium sulphate, ammonium nitrate or ammonium phosphate, as well as mixtures thereof, optionally with further additives, comprising forming a melt or solution susceptible of granulation of the ammonium salts, adding dicyandiamide in an amount to result in a total content of 0.1 to 10% by weight, to the melt or solution susceptible of granulation of the ammonium salt prior to its granulation and then effecting granulation of the ammonium salts.

2. The process of claim 1 wherein the dicyandiamide is solid and the ammonium salts are in the form of a water-containing melt.

3. The process of claim 2 wherein the dicyandiamide is added to the ammonium salts in dissolved form, further comprising the step of drying.

* * * * *